Nov. 15, 1949  E. GRONEMEYER  2,487,925
MOLDING DEVICE
Filed Dec. 23, 1946  2 Sheets-Sheet 1
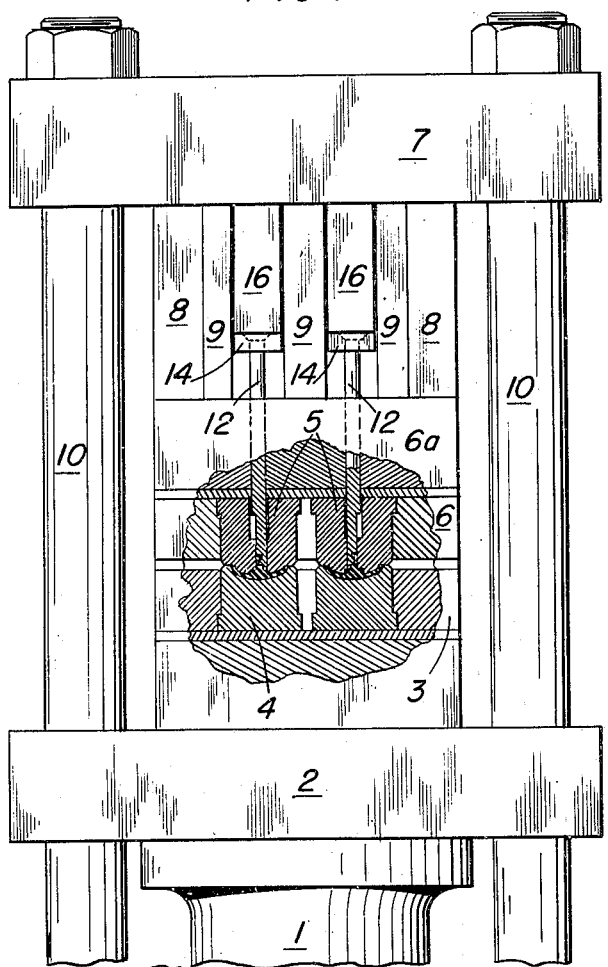
Inventor
Erich Gronemeyer
By his Attorneys
Howson and Howson.

Nov. 15, 1949  E. GRONEMEYER  2,487,925
MOLDING DEVICE
Filed Dec. 23, 1946  2 Sheets-Sheet 2
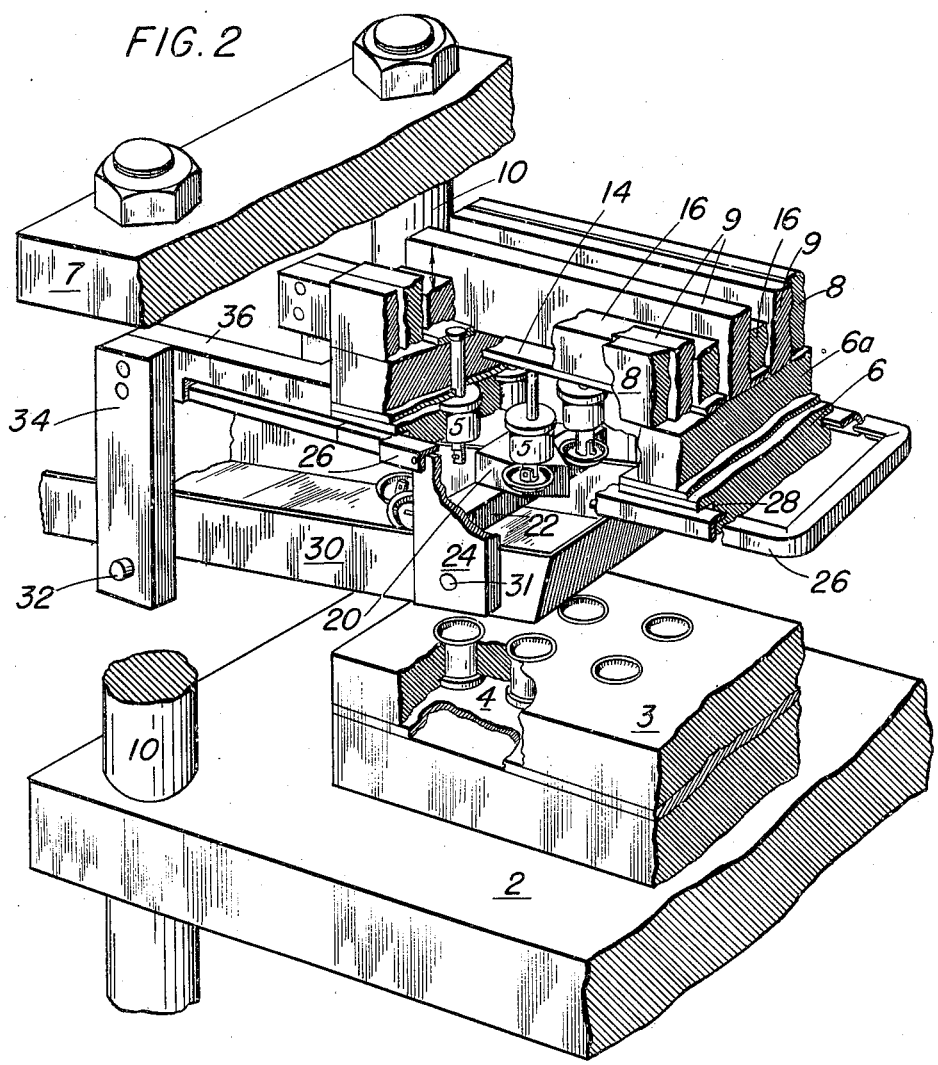
Inventor
Erich Gronemeyer
By his Attorneys
Howson and Howson Patented Nov. 15, 1949

2,487,925

UNITED STATES PATENT OFFICE 2,487,925

MOLDING DEVICE

Erich Gronemeyer, Pompton Plains, N. J., assignor to Mack Molding Company, Incorporated, Wayne, N. J., a corporation of New Jersey Application December 23, 1946, Serial No. 717,950

3 Claims. (Cl. 22—94)

This invention relates to molding machines and more particularly to machines for molding articles having stems and it is an object of this invention to provide a machine for molding articles of the class described which will mold the article with a perforation in the stem thereof in such manner as to permit of the ready removal thereof from the machine and it is a further object of this invention to provide a machine having means for rapidly effecting the removal of the articles from the machine.

In the drawings in which is illustrated a preferred embodiment of this invention—

Fig. 1 is a partial view in front elevation of a molding machine in accordance with this invention, parts being omitted and broken away to show the molding dies in section and with a molded object between the dies;

Fig. 2 is a partial broken perspective view, various parts being broken away to show other parts more clearly;

Fig. 3 is a perspective view of the ejector portion of the male die shown detached;

Figs. 4, 5 and 6 are fragmentary sectional views drawn to a larger scale and showing the molding dies in various steps of the molding operation; Fig. 4 showing the dies separated with the molding material in position on the lower die; Fig. 5 showing the dies closed on the molding material; and Fig. 6 showing the molded article ejected from the upper die and retained on the ejector; and Fig. 7 is a perspective view of a molded article of a type intended to be molded by molding machines in accordance with this invention.

In the drawings, the invention is shown in connection with a molding machine having dies for molding buttons, the dies being arranged in accordance with this invention to mold the button stems with perforations therein and only such parts of the machine are shown as are necessary to illustrate the invention. The machine shown comprises a ram 1 mounted on a suitable base (not shown) and carrying a ram plate 2 on which is mounted a mold block 3 having the lower dies 4 secured therein. Cooperating with the lower dies 4 are upper dies 5 mounted in a mold block 6 secured to a press head 7 but spaced therefrom by die shoes 8 and spacers 9, the press head 7 being secured to the machine base by the strain rods 10.

The lower dies 4 are recessed to form the faces of the buttons and the upper dies 5, which are shaped to form the button backs, are formed with axially arranged openings 13 to receive ejector pins 12. The ejector pins 12 are of sufficient length to extend through the upper dies 5 and an upper mold block 6a and project beyond a short distance permitting their ends to be fixed in plates 14 arranged to travel between the spacers 9, the upward movement of the plates 14 being limited by pin bars 16 mounted on the plates 14, the weight of the pin bars 16 serving to depress the ejectors 12 and eject the molded articles from the upper dies 5 when the dies are separated after a molding operation. The lower portions of the openings 13 and the ejector pins 12 are shaped to cooperate in forming the base 15a of the stem 15b of the button 15 and the lower portion of the ejector pins is partially cut away, as at 12a to provide a flat surface which cooperates with a parallel flat surface on the inner face of the opening 13 in forming the button stem 15b. A projection 12b on the flat surface of the ejector pin 12 forms a perforation 15c which extends the greater portion of the thickness of the stem 15b leaving but a very thin flashing, closing one end of the opening 15c. This flashing is readily removed by tumbling the molded buttons.

The projection 12b has a main axis at an angle from the axis of the ejector 12. In the particular embodiment shown in the drawing, the projection is spaced from the free end of the ejector, and is at substantially a right angle to the axis of the ejector. However, other embodiments within the scope of my claimed invention will occur to those skilled in the art.

In molding buttons on the machine described, tablets 18 of the proper size are placed upon the lower dies 4 while the upper and lower dies are separated. At this time, the ejector pins 12 project below the upper dies. As the dies are brought together by raising the lower dies 4, the ejector pins 12 are forced upwardly until further movement is prevented by the engagement of the pin bars 16 with the press head 7, the ejector pins being held in this position as the dies are brought together and the buttons molded. Upon completion of the molding, as the dies are separated by the withdrawal of the lower dies 4, the pin bars 16 operate the ejector pins 12 and move the molded articles from the upper dies 5 as shown in Fig. 6.

The engagement of the projection 12b on the ejector pin 12 in the aperture 15c in the stem 15b of the molded article holds the article on the pin and removal of the article from the pin without breaking the stem can be accomplished only by movement of the article in the direction of the axis of the projection 12b on the pin 12. To provide for the expeditious removal of the articles from the pins in perfect condition, adjacent rows of the upper dies 5 are arranged in pairs so that the projections 12b on the pins 12 of each pair of rows project away from each other, as shown in Fig. 2, and there is provided a wiper 20 mounted on a cross-bar 22 attached to side members 24 carried by a handle 26 formed of an angle member mounted to travel in guides 28 on the upper mold 6. The wiper 20 is supported in position to be drawn between the molded articles retained on the pins 12, the tapered front end of the wiper forcing the molded articles from the projections 12b into a tray 30 which is pivotally connected at its forward end to the side members 24, as at 31, and slidably supported upon a cross member 32 carried by side members 34 attached to a bracket 36 secured to the mold block 6, the arrangement being such that as the wiper 20 is drawn forward the tray is raised to a horizontal position and brought forward to receive the molded articles and as the wiper is pushed back the tray is pushed back and tilted to dump the articles into a receptacle.

I claim:

1. Means for molding articles comprising a plurality of pairs of cooperating dies arranged in pairs of spaced rows, an ejector movably mounted in a die of each pair, means for projecting said ejectors when the cooperating dies are separated, a projection on each ejector at an angle from the axis thereof with the projections of adjacent rows oppositely directed, said ejectors and projections cooperating with the dies in which said ejectors are mounted in the molding of the articles, said projections retaining the articles on said ejectors when said ejectors are projected, and means for forcing in opposite directions the articles on adjacent rows of ejectors to remove the articles from the ejectors.

2. Means for molding articles comprising a pair of cooperating dies, an ejector movably mounted in one of said dies and a projection on said ejector having a main axis at an angle to the axis of the ejector for molding a recess in the article, said projection being adapted to retain the article on said ejector, and means for freeing the article from the projection comprising a wiper for moving the molded article in the direction of the axis of the projection.

3. Means for molding articles comprising a plurality of pairs of cooperating dies arranged in pairs of spaced rows, an ejector movably mounted in a die of each pair, means for projecting said ejectors when the cooperating dies are separated, a projection on each ejector at an angle from the axis thereof with the projections of adjacent rows oppositely directed, said ejectors and projections cooperating with the dies in which said ejectors are mounted in the molding of the articles, said projections retaining the articles on said projections when said ejectors are projected, and a wedge shaped wiper for forcing in opposite directions the articles on adjacent rows of ejectors to remove the articles from the projections.

ERICH GRONEMEYER.

REFERENCES CITED

The following references are of record in the file of this patent:

UNITED STATES PATENTS

| Number | Name | Date |
|--------|------|------|
| 117,397 | Ellis | July 25, 1871 |
| 1,556,699 | Lee | Oct. 13, 1925 |
| 1,914,031 | Mahny | June 13, 1933 |
| 2,367,962 | Reibold et al. | Jan. 23, 1945 |
| 2,380,084 | Strauss | July 10, 1945 |
| 2,409,142 | McCoy | Oct. 8, 1946 |
| 2,412,411 | McGinnis | Dec. 10, 1946 |